United States Patent
Payne et al.

(10) Patent No.: US 9,266,443 B2
(45) Date of Patent: Feb. 23, 2016

(54) SYSTEM AND METHOD FOR ADAPTIVE BATTERY CHARGE AND DISCHARGE RATES AND LIMITS ON KNOWN ROUTES

(71) Applicant: Toyota Motor Engineering & Manufacturing North America, Inc., Erlanger, KY (US)

(72) Inventors: Joshua D. Payne, Irvine, CA (US); Mohammad E. Dufford, Los Angeles, CA (US); Eiji Fukushiro, Long Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 40 days.

(21) Appl. No.: 14/231,537

(22) Filed: Mar. 31, 2014

(65) Prior Publication Data
US 2015/0274028 A1    Oct. 1, 2015

(51) Int. Cl.
*B60L 9/00* (2006.01)
*B60L 11/18* (2006.01)
*G01C 21/34* (2006.01)

(52) U.S. Cl.
CPC .......... *B60L 11/1861* (2013.01); *B60L 11/1809* (2013.01); *G01C 21/3461* (2013.01); *G01C 21/3469* (2013.01); *Y10S 903/903* (2013.01)

(58) Field of Classification Search
CPC ............ B60W 30/182; B60W 50/085; B60H 1/00771
USPC .............. 701/22, 23, 25; 180/65.1, 65.21, 180/65.285, 65.29, 410; 320/128, 132, 134, 320/104, 107
See application file for complete search history.

(56) References Cited

U.S. PATENT DOCUMENTS

| | | | |
|---|---|---|---|
| 6,076,964 A | 6/2000 | Wu et al. |
| 6,118,237 A | 9/2000 | Kikuchi et al. |
| 6,233,517 B1 | 5/2001 | Froeberg |
| 6,314,347 B1 | 11/2001 | Kuroda et al. |
| 6,688,122 B2 | 2/2004 | Matsuoka |
| 6,941,222 B2 | 9/2005 | Yano et al. |
| 7,058,506 B2 | 6/2006 | Kawase et al. |
| 7,154,068 B2 | 12/2006 | Zhu et al. |
| 7,199,559 B2 | 4/2007 | Yanagi |

(Continued)

FOREIGN PATENT DOCUMENTS

| | | |
|---|---|---|
| DE | 10035027 | 7/2000 |
| DE | 10233376 | 2/2004 |

(Continued)

OTHER PUBLICATIONS

US 8,447,504, 05/2013, Konishi et al. (withdrawn)

*Primary Examiner* — Luke Huynh
(74) *Attorney, Agent, or Firm* — Snell & Wilmer LLP (57) ABSTRACT

A system and a method for adaptively adjusting a charge and/or discharge rate and a limit of a battery based on a known driving route are described. The method includes storing, in a memory, a known driving route having a plurality of segments, where each segment has a corresponding discharge rate of the battery which was obtained from a previous trip of the vehicle along the same segment. The method also includes calculating, using a processor, an optimal discharge rate for the known driving route, and applying, using the processor, the optimal discharge rate of the vehicle to each segment of the route.

21 Claims, 6 Drawing Sheets

(56) References Cited

U.S. PATENT DOCUMENTS

| | | |
|---|---|---|
| 7,221,287 B2 | 5/2007 | Gueziec et al. |
| 7,233,861 B2 | 6/2007 | Van Buer et al. |
| 7,360,615 B2 * | 4/2008 | Salman et al. ........... 180/65.265 |
| 7,395,149 B2 | 7/2008 | Matsumoto et al. |
| 7,610,145 B2 | 10/2009 | Kantarjiev et al. |
| 7,657,373 B2 | 2/2010 | Kindo |
| 7,778,769 B2 | 8/2010 | Boss et al. |
| 7,783,396 B2 | 8/2010 | Arita et al. |
| 7,788,027 B2 | 8/2010 | Jones |
| 7,877,198 B2 | 1/2011 | Tenzer et al. |
| 7,880,597 B2 | 2/2011 | Uchida |
| 7,999,505 B2 | 8/2011 | Bertness |
| 7,999,664 B2 | 8/2011 | Barajas |
| 8,063,609 B2 | 11/2011 | Salasoo et al. |
| 8,068,977 B2 | 11/2011 | Ozawa et al. |
| 8,073,615 B2 | 12/2011 | Kudoh et al. |
| 8,165,791 B2 | 4/2012 | Yamada et al. |
| 8,175,802 B2 | 5/2012 | Forstall et al. |
| 8,204,640 B2 | 6/2012 | Tani et al. |
| 8,258,726 B2 | 9/2012 | Okuda et al. |
| 8,290,637 B2 | 10/2012 | Krupadanam et al. |
| 8,336,651 B2 | 12/2012 | Nishi et al. |
| 8,346,420 B2 | 1/2013 | Tarnowsky et al. |
| 8,370,012 B2 * | 2/2013 | Yamada et al. ................. 701/22 |
| 8,392,116 B2 | 3/2013 | Lehmann et al. |
| 8,428,804 B2 | 4/2013 | Sakai et al. |
| 8,457,874 B2 | 6/2013 | Kancharla et al. |
| 8,478,642 B2 | 7/2013 | Dey et al. |
| 8,498,809 B2 | 7/2013 | Bill |
| 8,509,987 B2 | 8/2013 | Resner |
| 8,515,607 B2 | 8/2013 | Amano et al. |
| 8,532,920 B2 | 9/2013 | Coleman et al. |
| 8,548,660 B2 | 10/2013 | Thai-Tan et al. |
| 8,576,057 B2 | 11/2013 | Sekiyama et al. |
| 2004/0230376 A1 | 11/2004 | Ichikawa et al. |
| 2008/0012535 A1 | 1/2008 | Takatsuji et al. |
| 2008/0027639 A1 * | 1/2008 | Tryon ........................... 701/209 |
| 2008/0252484 A1 | 10/2008 | Hopkins |
| 2009/0082967 A1 | 3/2009 | Hara et al. |
| 2009/0138190 A1 | 5/2009 | Kulik et al. |
| 2009/0293522 A1 | 12/2009 | Miyazaki |
| 2010/0090818 A1 | 4/2010 | Sekiyama et al. |
| 2011/0127958 A1 | 6/2011 | Ishishita et al. |
| 2011/0161001 A1 | 6/2011 | Fink |
| 2011/0166773 A1 | 7/2011 | Raz et al. |
| 2011/0231354 A1 | 9/2011 | O'Sullivan et al. |
| 2011/0246010 A1 | 10/2011 | de la Torre Bueno |
| 2012/0032637 A1 | 2/2012 | Kotooka et al. |
| 2012/0035843 A1 | 2/2012 | Miura et al. |
| 2012/0158228 A1 | 6/2012 | Biondo et al. |
| 2012/0173245 A1 | 7/2012 | Miyahara et al. |
| 2012/0200257 A1 | 8/2012 | Schwarz et al. |
| 2012/0290149 A1 | 11/2012 | Kristinsson et al. |
| 2012/0316712 A1 | 12/2012 | Simonini et al. |
| 2013/0013183 A1 | 1/2013 | Surnilla et al. |
| 2013/0024060 A1 | 1/2013 | Sukkarie et al. |
| 2013/0030694 A1 | 1/2013 | Nortrup |
| 2013/0131892 A1 | 5/2013 | Hashimoto et al. |
| 2013/0198031 A1 | 8/2013 | Mitchell et al. |
| 2013/0229153 A1 | 9/2013 | Sarkar et al. |
| 2013/0261914 A1 | 10/2013 | Ingram et al. |
| 2013/0274952 A1 | 10/2013 | Weslati et al. |

FOREIGN PATENT DOCUMENTS

| | | |
|---|---|---|
| DE | 102005005002 | 8/2006 |
| EP | 2355018 | 8/2011 |
| GB | 2499712 | 8/2013 |
| JP | 2006-139963 | 6/2006 |
| JP | 2010-226880 | 10/2010 |
| JP | 2012-210004 | 10/2012 |
| JP | 2004-324613 | 11/2013 |
| WO | WO 2010/000239 | 7/2010 |
| WO | WO 2011/134992 | 11/2011 |
| WO | WO 2013/134863 | 9/2013 |

* cited by examiner

SYSTEM AND METHOD FOR ADAPTIVE BATTERY CHARGE AND DISCHARGE RATES AND LIMITS ON KNOWN ROUTES

BACKGROUND

1. Field

The present invention relates to a system and a method for adaptively adjusting a battery's charge and discharge rates and limits based upon a known driving route.

2. Description of the Related Art

Most hybrid, plug-in hybrid, and electric vehicles are designed such that the battery charge and/or discharge rates and limits are generally determined based on the power demand from the driver. The limits may be temporarily adjusted, such as during high power demand conditions, and this adjustment may only be allowed for a predetermined period of time to satisfy battery protection requirements. These charge and/or discharge rates and limits may also be set based on each selected operating mode of the vehicle, such as "ECO mode" or "EV mode". Thus, the running control is based completely on the immediate situation, and any optimization of battery power is calculated using broad generalizations. Accordingly, battery power use is not optimized, as any adjustment of the charge and/or discharge rates and limits may not be adaptively adjusted for specific stretches of driving.

Because of this, vehicles may encounter the following situations. First, a plug-in hybrid vehicle may rapidly deplete its charge at the beginning of a trip in order to avoid having any charge remaining when the trip ends, because the SOC discharge rate is not currently adaptable to specific situations. During sections with high power demand such as highways, the SOC may decrease rapidly and inefficiently, and the vehicle may exit EV mode in a shorter amount of time.

Second, a vehicle may need to accelerate for a short time, such as on an entry ramp on a highway. The vehicle may allow a temporary increase in the discharge rate limit, where the increase amount is set based on a predetermined allowable time to satisfy battery protection requirements. However, since the discharge rate limit is not currently adaptable, the vehicle may, unnecessarily, restrict the battery discharge rate and/or use engine power even though the actual acceleration time may be shorter than the predetermined allowable time.

So, it remains desirable to have a method and a system which allows the battery charge and/or discharge rates and limits to be adjusted, based both on immediate power demand from the driver and the needs of the driver and vehicle to complete the trip with optimal battery power usage. Therefore, if the expected power demand for a known route can be predicted, the charge and/or discharge rates and limits may be adaptively adjusted to allow for increased performance as well as battery power usage optimization.

Thus, there is a need for systems and methods, and/or devices, with adaptive battery charge and discharge rates and limits on a known route.

SUMMARY

This summary is included to introduce, in an abbreviated form, various topics to be elaborated upon below in the Detailed Description.

A system and a method for adaptively adjusting a charge and/or discharge rate and a limit of a battery based on a known driving route are described. The method includes storing, in a memory, a known driving route having a plurality of segments, where each segment has a corresponding discharge rate of the battery which was obtained from a previous trip of the vehicle along the same segment. The method also includes calculating, using a processor, an optimal discharge rate for the known driving route, and applying, using the processor, the optimal discharge rate of the vehicle to each segment of the route.

The method may also include adaptively adjusting a maximum discharge rate limit of a battery based on a known driving route. The method also may include storing, in memory, a segment of a known driving route which is associated with a high power request, and storing an amount and duration of discharge power requested on the segment during a previous trip of the vehicle along the same segment. The method may also include calculating, using a processor, a maximum discharge rate limit for the segment, and applying, using the processor, the maximum discharge rate limit to the segment.

The method may also include adaptively adjusting a maximum charge rate limit of a battery based on a known driving route. The method also may include storing, in memory, a segment of a known driving route which is associated with a high charging power increase, and storing an amount and duration of charge power requested on the segment during a previous trip of the vehicle along the same segment. The method may also include calculating, using a processor, a maximum charge rate limit for the segment, and applying, using the processor, the maximum charge rate limit to the segment.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements. A connection, when mentioned in this document, may refer to any communication connection between modules, and the communications may occur via a wired connection, a wireless connection, or a combination of the two.

Figure 1:
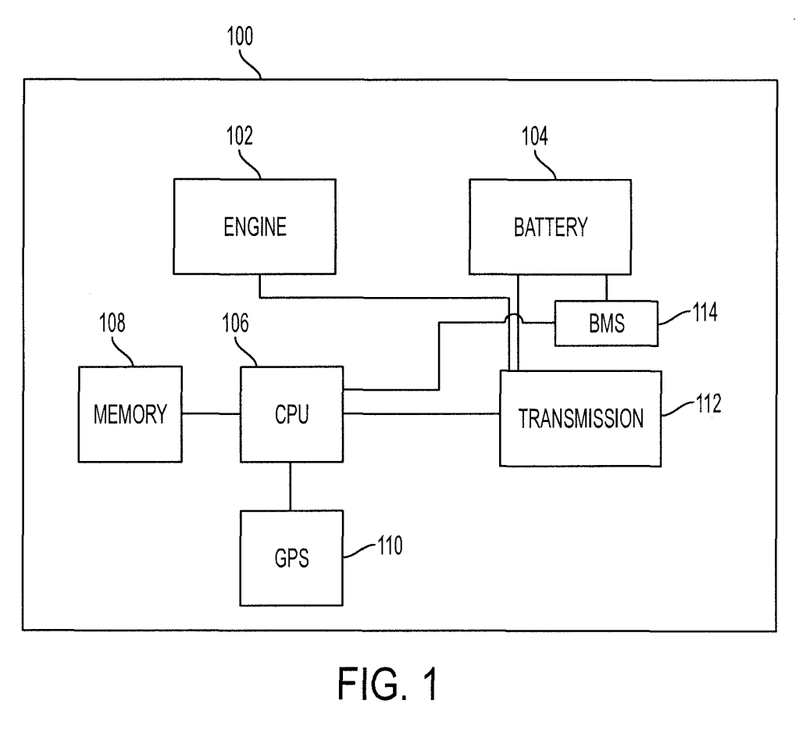
FIG. 1 illustrates components of a vehicle which may be utilized in a system or method for adaptive battery charge and discharge rates and limits on known routes according to an embodiment of the present invention.

Turning to FIG. 1, some components of a vehicle 100 are illustrated. The components of the vehicle 100 are not limited to the components shown and described in FIG. 1. The vehicle 100 may include an engine 102, a battery module (battery) 104 including at least one battery, a central processing unit (CPU) module 106 including at least one processor or controller, a memory module (memory) 108 including at least one storage device, a global positioning system (GPS) 110, a transmission module 112 which may contain one or more motor-generators, and/or a battery management system (BMS) 114. The CPU module 106 may be a processor, a controller, an application or other device capable of executing instructions or software. Most of these devices may be disposed in the vehicle 100, may be located in a location remote from the vehicle 100, or may be a combination of within and remote from the vehicle 100. The lines or connections shown in FIG. 1 can be wired, wireless or a combination thereof. Also, the lines or connections can be one way (one arrow) or two way (two arrows) showing the transfer of information and data in one or both directions.

The engine 102 and the battery module 104 may be connected to the transmission 112 with a controllable transmission input/output ratio for driving the wheels using torque provided by the engine 102 and/or the battery module 104. The engine 102 and/or the battery module 104 may be connected to the transmission 112, for example, via a differential linkage, power splitting mechanisms, and/or various other linkages known in the art.

In an embodiment, the vehicle 100 may be propelled in a direction by power output from either the engine 102 and/or the battery 104 (via at least one motor). The amount of power requested from the engine 102 and the battery 104 may be communicated to the engine 102 and the battery 104 by the transmission module 112. The transmission module 112 may receive instructions to alter the distribution of power from the CPU module 106, and may so instruct the engine 102 and the battery 104. The CPU module 106 may communicate with the memory 108, the GPS 110, the transmission module 112, and/or the BMS 114 by a connection. The CPU module 106 may also control clutching and gearing mechanisms associated with the transmission module 112 of the vehicle 100.

The GPS 110 may periodically or constantly receive location information from a satellite or satellites, and/or any other positioning devices. The transmission module 112 may determine, based on input from the CPU module 106, how much power output each of the battery 104 and the engine 102 should produce. In some embodiments, the BMS 114 may include equipment to determine a state of charge (SOC) and a charge/discharge rate and limit (kW) of the battery 104, and may communicate this information to the CPU module 106. In other embodiments, the BMS 114 may collect measurements from the battery 104, send the measurements to the CPU module 106, and then the CPU module 106 may calculate a SOC and a charge/discharge rate and limit of the battery 104.

A route, as used herein, may refer to a distance travelled between an event signaling a beginning of a trip and an event signaling an end of a trip. For example, such an event may be that the ignition is turned on and subsequently turned off. For example, such an event may be that a door of the vehicle 100 is opened and then shut, and then the door is subsequently opened and shut. The time and/or location of each event may be recorded. "Time," as used herein, may refer to a time of the day, a day of the week, a date, and/or any other temporal parameter that may be stored regarding a route segment, route, and/or a route set. A "location," as used herein, may refer to latitude and/or longitude coordinates, a GPS location, a location determined in reference to other known locations, and/or any other location data regarding the vehicle 100, route segment, route and/or route set.

A route set may refer to a number of different routes linked with one another. The distance values of each route within a route set may be summed in order to obtain a distance of the route set that includes linked routes.

An example will be provided to describe a route set. A driver may leave his house at a specified time in the morning every weekday to go to work. Let's assume that the driver stops at a coffee shop on his way to work every Monday and Wednesday. Let's further assume that on Mondays and Wednesdays, the driver stops at a gym on his way home. The CPU module 106 may, over time, recognize that route 1 is from his house to the coffee shop, route 2 is from the coffee shop to his work, route 3 is from his work to the gym, and route 4 is from the gym to his house. Furthermore, using a linking algorithm, the CPU module 106 may recognize two route sets, the combination of routes 1 and 2, and the combination of routes 3 and 4. For the sake of simplicity, when a route is mentioned in the present document, it may be referring to a route or a route set.

One embodiment of a system or a method of route prediction will now be described. The memory 108 may include a static data storage or database which may include a segment list and a route list. Within this document, "data storage and database" and memory 108 may be referred to as one in the same. The segment list may include a plurality of segments. Each of the plurality of segments in the segment list may include a segment identifier, a segment distance, one or more "to" segments, one or more "from" segments, and a plurality of locations. The segment distance may represent the total distance of the segment. The one or more "from" segments may include segment identifiers for segments which have been historically traveled immediately before the segment, and the one or more "to" segments may include identifiers for segments which have historically been traveled immediately after the segment. Each location may include location information, including, but not limited to, latitude, longitude, altitude, speed, course, heading, direction, etc.

The route list may include a plurality of routes. The routes may include a route identifier and an ordered list of segments.

A dynamic data storage or database may also be included within the memory 108. The dynamic data storage or database may include a route history, which may include a plurality of route history entries. Each of the plurality of route history entries may include a route identifier and a route occurrence entry for each time the route was travelled. Each of the plurality of route history entries may also include a start date, a start time, a day of the week, and an ordered list of segments. Each of the segments in the ordered list may include an ordered list of segment identifiers, which correspond to one of the plurality of segments stored within the static data storage or database. Each of the plurality of segments may also include a start time, an end time, a maximum speed, a minimum speed, an average speed, etc.

An exemplary method for parsing segments will now be described. The GPS 110 may receive a first signal indicative of a first location which may include latitude, longitude, altitude, heading, direction, speed, and/or any combination, along with any other information. If the signal does not include a heading and/or a speed, the CPU module 106 may calculate a heading and/or speed based on previous location information from the GPS 110. The vehicle 100 may include sensors such as a gyroscope, an accelerometer, and/or any other sensor, configured to detect the heading and speed of the vehicle 100.

The vehicle 100 may store locations in the memory 108 at regular or periodic intervals. The vehicle 100 may also store, in the memory 108, locations parsed by a predetermined distance. The locations may all include a timestamp, may be successively numbered, and/or may be placed in order by any other method available.

In an embodiment, at least two of the locations will include a heading used for detecting when a turn has occurred. The CPU module 106 may calculate a difference between the current heading and a previous heading to determine if more than a heading threshold amount has been exceeded. For example, the heading threshold may be 50 degrees. If the CPU module 106 determines, by calculating the difference between the previous heading and the current heading, that the difference is 60 degrees, which is above the heading threshold, then the CPU module 106 may determine that a turn has occurred. The heading threshold is not limited to 50 degrees, and in fact may be any degree of change in heading. For example, the current heading may be calculated based on the change in latitude and longitude between the current and any previous location.

This method may be used as well to calculate a previous heading. To make this calculation, the CPU module 106 may need to calculate a heading difference between two or more previous locations. The previous locations used to calculate the previous heading may be calculated based on the current speed of the vehicle 100. For example, if the speed is less than 30 mph, then the previous heading may be calculated for the third preceding location (for example, based on the difference in latitude and longitude between the third and fourth preceding locations). However, if the speed is between 30 mph and 60 mph, then the previous heading may be calculated for the sixth preceding location. One of ordinary skill in the art will realize that the speed is not necessary in the equation to determine a previous location, and the correlation between the speed and the number of previous locations may be different than mentioned above.

With the current and previous heading information, the CPU module 106 may calculate a difference between the current and previous headings. For example, this may be calculated by subtracting one of the current or previous headings from the other of the current or previous heading.

The CPU module 106 may compare the difference in the current and a previous heading to determine if a turn has occurred. A turn has occurred if the difference in headings exceeds the heading threshold.

The CPU module 106 may be configured to store, in the memory 108, a segment when a turn has occurred. The segments typically represent a geographic area between detected turns, and may be stored in the segment list. The stored segment may include a starting location and an ending location. The stored segment may also include one or more of the previous locations. The segment may be stored in the static data storage or database in the segment list and/or may be added to the ordered list of segments within the dynamic data storage or database. This is an example of one embodiment for parsing and storing segments, and there are other embodiments which use vehicle speed, road conditions, vehicle stops, etc., as mentioned above, with which to parse routes into segments.

In this embodiment of route prediction, the CPU module 106 may predict a route based on the segment list as discussed below. In this embodiment, the CPU module 106 may receive, from the GPS 110, a second signal representing another location. The second signal may include a latitude, longitude, altitude, heading and/or speed. Based on the second signal and a previous signal, the CPU module 106 may identify segment candidates from the segment list. One method of identification is to determine the distance between the second location and each location of each segment in the segment list, and identify the one or more segment candidates as those which have at least one location within a threshold distance from the second location. Thus, any segment within the threshold distance may be identified as a segment candidate.

In some embodiments, a list of route candidates may be determined by the CPU module 106 and stored in the memory module 108. These candidates may be identified by determining which routes of the route list include any of the segment candidates, and then identifying the routes including the segment candidates as route candidates.

In some embodiments, the CPU module 106 may calculate and/or assign a route weight for each of the identified candidate routes. In one example, the route weight for each of the identified candidate routes may be calculated based on information associated with that route in the memory module 108. The route weight may be calculated based on the start date, the start time, the day of the week, the time of the day, the ratio of number of times the candidate route was travelled to the total number of times all candidate routes were travelled, etc. The route weight may include multiple components, such as when the route includes a day of the week component, a type of day component, and a time of day component. The day of the week components may be calculated by dividing the total number of times that the candidate route is included in the data storage or database on the current day of the week by the total number of times that candidate is included in the data storage or database. Along the same manner, the type of day component may be calculated by dividing the total number of times the candidate was included on the current type of day by the total number of times the candidate is in the data storage or database. Similarly, a time of day weight may be calculated by dividing the total number of times the candidate is included at the particular time of day by the total number of times the candidate is in the data storage or database. These are only examples and are not intended to limit the route weight calculation methods.

Once the CPU module 106 has calculated the route weights for all candidate routes, the CPU module 106 may select the predicted route by selecting the candidate route with the highest route weight. The list of candidate routes and/or candidate segments may be updated continuously or periodically by the CPU module 106 based on the current location of the GPS 110.

In some embodiments, after a predicted route is selected, the GPS 110 (or any other display equipment within and/or displaced from the vehicle 100) may display the route graphically. The display equipment may receive input from a user which indicates confirmation of whether the predicted route is correct. However, some embodiments may not request a confirmation of the predicted routes. In some embodiments, if the user indicates that the predicted route is not correct, then the CPU module 106 may display one or more predicted routes and request a confirmation.

The memory 108 may contain a data storage or database containing route, segment, SOC, and charge/discharge rates and limit information. The driving route may be parsed into one or more segments based on one or more different identifiers. These identifiers include, but are not limited to, a change in the speed of the vehicle 100, a cross street, a stop of the vehicle 100 (e.g., representing anything from stopping to pick up a passenger, a stop at a defined location such as a traffic light, a stop sign, a store, a bank, a restaurant, a place of work, etc.), a turn (e.g., a curve in the road, a turn of about 90 degrees, or a U-turn, etc.), road conditions (e.g., a smooth/rough road transition, a road with many potholes, a road with road construction materials, etc.), a predetermined distance, a predetermined travel time, an incline or decline of a road such as a hill, or any change of a setting, either driver or vehicle 100 induced. However, the presence of the identifiers may not necessarily always result in a new segment being defined.

Furthermore, to facilitate adaptive battery charge and discharge, the route is not required to be divided into segments. For example, a route may be stored in the memory 108 simply as a route, without segments, and the SOC and charge/discharge rates and limit information may be recorded based on distance intervals and/or time intervals from the start of the route. For simplicity, all parsed pieces of the route, whether segments and/or identified by the distance from the beginning of the route, will be described as "segments".

The data storage or database may include a plurality of entries, comprising at least one route identifier, at least one segment identifier for each route, and battery charge information. The data storage or database may include battery charge information for each segment of each route, such as SOC, charge/discharge rates (%/s), and/or maximum charge/discharge limit (%/s) (the maximum charge/discharge rate allowed for the segment). Each time the vehicle 100 travels on a new route, an entry for the new route and each of the new segments may be recorded in the data storage or database within the memory 108. Additionally, each time the vehicle 100 travels on the known route, the entry for each of the segments of the known route may be updated in the memory 108. For example, the update may edit the SOC and/or charge/discharge rates and/or maximum charge/discharge limits associated with the segment.

Before adaptive battery charge and discharge, during a short-term, high power demand portion of a drive, such as an EV mode when a user gives a power request (depress the gas/acceleration pedal, etc.), the engine 102 may become engaged by the transmission 112. However, if the CPU module 106 can learn the power discharge history of a route, then the CPU module 106 may be able to calculate an optimal discharge limit such that the engine 102 may not be engaged, so that the vehicle response is greater.

Additionally, the CPU module 106 may calculate an optimal discharge rate which may allow the vehicle to remain in EV mode and/or not engage the engine 102 or engage the engine 102 to a lesser degree over a longer term drive, such that the vehicle 100 will be more energy efficient.

When the vehicle 100 traverses the known route, the CPU module 106 may receive, from the memory 108, at least one information entry for the known route. Based on the at least one information entry and current battery charge information received from the BMS 114 and/or its own calculations, the CPU module 106 may determine, for each of the segments of the known route, the optimal amount of charge to be used for the segments. For example, the CPU module 106 may instruct the engine 102 to produce more energy and/or the battery 104 to produce less energy, if the CPU module 106 determines that the SOC remaining after the segment should be greater than currently scheduled or if the CPU module 106 determines that the SOC remaining should be lower on the segment, in order to optimize energy efficiency and/or performance. Likewise, the CPU module 106 may instruct the battery 104 to produce more energy and/or the engine 102 to produce less energy, if the CPU module 106 determines that the SOC remaining after the segment should be less than currently scheduled or if the CPU module 106 determines that the discharge rate should be higher than currently scheduled on the segment, in order to optimize energy efficiency and/or performance. Thus, the battery discharge rate and/or limit may be altered, between certain rates, if the route is known and the CPU module 106 determines that depletion at a certain rate and/or limit is optimal. For example, a CPU module 106 may only allow the battery 104 to discharge at a certain maximum limit because rapid discharge of the battery 104 (equating to high power output), especially over a longer period of time, may be hazardous to the battery 104, for example, by causing overheating. However, if the CPU module 106 knows of a very rapid but short in duration power request segment (such as a freeway on-ramp), the CPU module 106 may allow the battery 104 to discharge at a faster limit, such that enough power is provided by the battery 104 to complete the short duration power request segment without requiring an increase in power output from the engine 102.

Additionally, the CPU module 106 may instruct the engine 102 and/or battery 104 to operate in such a manner as to increase the SOC (e.g., through a generator connected to the battery 104) at certain times, such as a short, steep decline where regenerative braking is utilized, and/or any other driving events which may increase the SOC of the battery 104. In this case, the CPU module 106 may cause the maximum charge limit to increase. For example, a CPU module 106 may only allow the battery 104 to charge at a certain rate because rapid increase of SOC over a long period of time may be hazardous to the battery 104, for example, by causing overheating. However, if the CPU module 106 determined that a very rapid but short in duration decline was approaching, the CPU module 106 may allow the battery 104 to increase in SOC at a faster limit. Some examples of when the CPU module 106 may instruct the engine 102 and/or battery 104 to operate in a manner in which performance is optimized based on a known route may be found below.

For one example, the CPU module 106 may determine, based on information from the at least one entry within the memory 108, that a segment which requires more power to traverse is about to be reached by the vehicle 100. For example, this segment may be a freeway on-ramp, a steep hill, etc. Let's assume that the current mode of the vehicle 100 is operating such that the average discharge rate is −0.02%/s, and that at higher power requests, the discharge rate may generally be increased up to a maximum discharge limit of −0.1%/s. If the CPU module 106 determines, based on information entries for the route and current charge information, that there is enough SOC remaining such that the entire segment which requires more power may be traversed with a higher discharge rate without the SOC dropping below a SOC discharge threshold value (discharge threshold represents a SOC value at which SOC should stop depleting, for example, for the protection of the battery 104), then the CPU module 106 may instruct the transmission module 112 to adjust such that the maximum discharge limit may be higher for that segment than the current limit of −0.1%/s. This may result in the engine 102 not being required to turn on, or at least not being required to increase its power output, throughout the segment. This also may allow for quicker performance, as the vehicle 100 may respond more quickly to power requests (such as a driver pressing a gas pedal) if the power of the vehicle 100 is provided by the battery 104 than it would if the power were provided by the engine 102. Additionally, the performance of the vehicle 100 may be increased: if the engine 102 and battery 104 were already both producing power, the power output from the battery 104 could increase, thus resulting in a larger total sum of power output from the vehicle 100.

Continuing the example, let's assume that the CPU module 106 determines, based on information entries for the route and current charge information, that there is not enough SOC remaining such that the entire segment which requires more power may not be traversed with a rate of discharge at the higher discharge limit of −0.1%/s. In this example, the CPU module 106 may determine that at a lower discharge rate, such as −0.05%/s, the battery 104 could still deplete constantly throughout the entire segment which requires more power, without the SOC dropping below the discharge threshold. If so, the CPU module 106 may instruct the transmission module 112 to adjust such that the maximum discharge limit is at a value such that the SOC does not drop below the discharge threshold, yet still is constantly depleting throughout the segment, and may reach a discharge threshold at the end of the segment. This may allow for better energy efficiency, as the battery 104 would remain in a depleting state over the entire segment. This may also result in protecting the battery 104 by ensuring the battery hardware protection limits are satisfied.

The CPU module 106 may, in some embodiments, alter the discharge rate of the battery 104 to maximize thermal efficiency over an entire route. In certain vehicle modes (such as EV mode), more power for the vehicle 100 may be provided by the battery 104 than the engine 102 on certain parts of a driving route. This may occur on segments which require more power than other segments, such as a highway segment as opposed to a city segment. Drawing more power from the battery 104 for a long duration (such as a highway segment of a driving route) equates to drawing a high amount of current from the battery 104. When high amounts of current are drawn, the battery 104 will heat up and deplete faster, resulting in greater energy depletion and losses from internal resistance.

If the vehicle 100 is traveling on a known route, the CPU module 106 may know where such segments exist, for example, where on the route a highway segment may exist. The CPU module 106 may adjust the power balance of the vehicle 100 to maximize energy efficiency by computing optimal discharge rate(s) for the route. For example, the CPU module 106 may utilize the knowledge of where the highway segment is, how long the highway segment is, the length of the entire trip, the discharge rate history for each segment, etc., in order to compute an optimal discharge rate for the route. Applying the optimal discharge rate may result in the battery 104 providing less power for the vehicle 100 over the longer, higher power demand segments than the battery 104 would provide over these segments otherwise. Thus, by applying this optimal discharge rate over the entire route, the battery 104 can operate at lower currents and a cooler temperature and therefore become more efficient.

As an example of utilizing an optimal discharge rate to increase efficiency, let's assume that a route includes a highway segment and a city segment. Let's assume that the discharge rate over the city segment is −0.02%/s and the discharge rate over a highway segment is −0.05%/s. At this higher discharge rate of −0.05%/s, more power (current) will be drawn from the battery 104, which will result in the battery 104 increasing in heat and internal losses, especially over a longer period of time, such as a highway distance. This increase in heat will in turn cause the battery 104 to operate less efficiently, and thus power will be wasted.

On the first pass of the route, the CPU module 106 may record, in the memory 108, each segment of the route, and each discharge rate associated with each segment (which may be determined by utilizing the BMS 114). With this knowledge, the CPU module 106 may calculate an optimal discharge rate for each segment of the route, which may be the same discharge rate for each segment, and store this information in the memory 108. This discharge rate may be lower than the −0.05%/s, the discharge rate of the battery 104 during the highway segment, so that the battery 104 can be more efficient. Then, the next time the vehicle 100 traverses the known route, the CPU may cause, by utilizing the transmission 112, the battery 104 to discharge at the optimal discharge rate, thus causing the vehicle 100 to be more efficient over the entire route.

This optimal discharge rate may also allow the vehicle 100 to remain in a mode, such as EV mode, for more of the entire route. Additionally, the optimal discharge rate may allow the vehicle to deplete SOC at a level where the SOC will reach the discharge threshold at the moment when the route ends, thus optimizing the battery power usage. For example, when the vehicle 100 is in a mode such as an EV mode, and the engine off/low mode is inhibited by driving conditions (such as high speed on freeways or high power demand), the CPU module 106 may lower the rate of battery discharge such that the SOC drops at a rate comparable to city driving.

In embodiments, the optimal discharge rate may be calculated for any other mode of the vehicle 100, such as eco mode, sports mode, super sports mode, etc. For example, in another mode, the CPU module 106 may have stored in the memory 108, for a known route, a record of all power requests. The CPU module 106 may be able to calculate, based on this information in the memory, an optimal battery discharge rate for each segment of the route, such that there is enough SOC remaining in the battery for all large power requests, such as all on-ramps, or all uphills, or anywhere else where performance may be desired. The CPU module 106 may also utilize calculated maximum discharge limits for the large power request segments in the calculation of the optimal discharge rate(s). In this case, the CPU module 106 may calculate a discharge rate such that the battery 104 keeps within it enough charge to give optimal performance for all high power demand segments, and discharge the rest at a calculated rate, for example, so it may be distributed over the other segments. This type of combination of optimal discharge rates for a route may be utilized with any mode of the vehicle 100.

Figure 2:
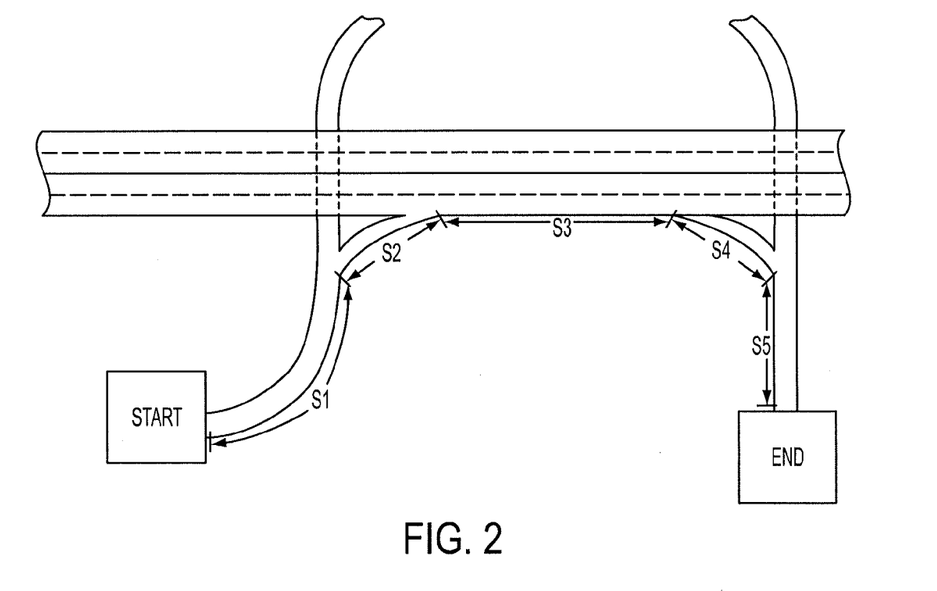
FIG. 2 illustrates an exemplary known route which is parsed into 5 segments according to an embodiment of the present invention.

FIG. 2 represents an exemplary known route, the roadway between the start location and the end location. The route may be parsed into 5 segments: S1, S2, S3, S4, and S5. The segments may be parsed by any of the identifiers discussed above in reference to FIG. 1. In this illustration, S1 and S5 represent city segments, S2 represents a highway on-ramp segment, S3 represents a highway segment, and S4 represents a highway off-ramp segment.

Figure 3:
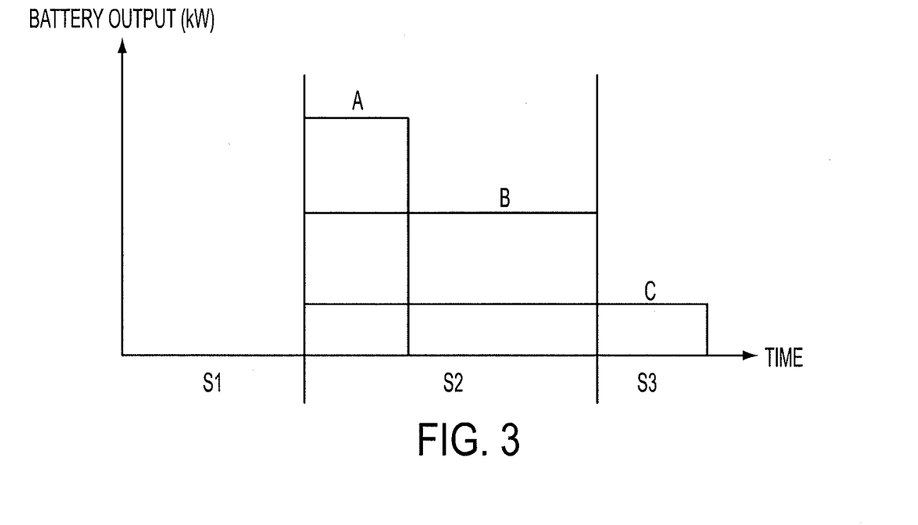
FIG. 3 illustrates possible maximum discharge rate limits for the battery according to an embodiment of the present invention.

FIG. 3 illustrates possible maximum discharge rate limits for the battery 104. In this example, the vehicle 100 has a high power demand for a short time during the freeway on-ramp segment S2. As shown, the highest maximum discharge rate limit, A, provides the most power but only allows it for a short time. The lowest maximum discharge rate limit, C, provides the least amount of power but allows it for a longer time. Maximum discharge rate limit B is in between A and C, thus producing more power than C and less than A, yet last for a longer period of time than A and shorter than C. The length of time each maximum discharge rate limit is allowed may be the length of time in which it would take the battery 104 to reach the discharge threshold at the maximum discharge limit, or it may be an amount of time during which the battery would not exceed hardware protection limits.

As is illustrated in FIG. 3, maximum discharge limit B provides the highest power allowed in order to complete segment S2. Using the known route information, the CPU module 106 can select the maximum discharge limit for the high power demand segment S2. The maximum discharge limit appears to be B, because B allows the highest power output that can be allowed in order for the power to be available for the entire segment. By allowing for this adaptive battery discharge, the driver of the vehicle 100 will be provided with the best performance the vehicle 100 can provide utilizing the battery 100, because the maximum available power of the battery 104 will be provided, and the power will last the entire requested length of time.

Figure 4A:
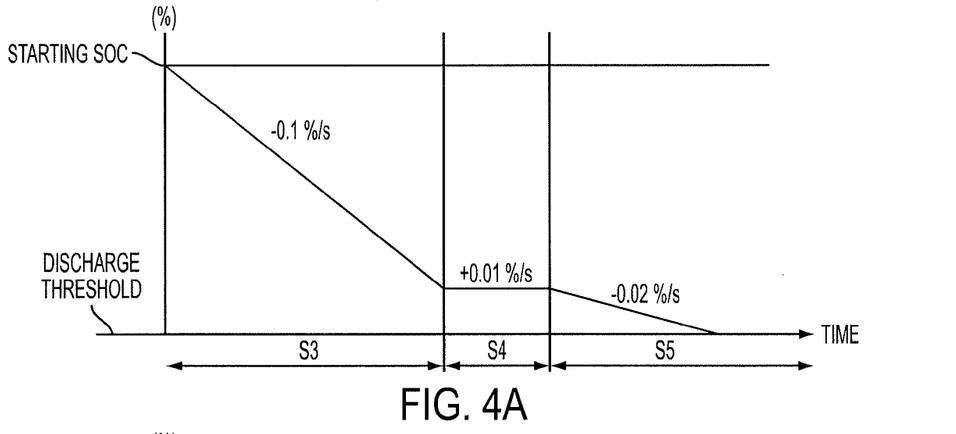
FIG. 4A illustrates discharge rates of a vehicle which is not utilizing adaptive battery charge and discharge rates according to an embodiment of the present invention.

FIG. 4A illustrates discharge rates of a vehicle which is not utilizing adaptive battery charge and discharge rates and limits. In FIG. 4A, a graphical depiction of SOC depletion over segments S3 (highway segment), S4 (off-ramp), and S5 (city) is illustrated. The y-axis depicts SOC (%), and the x-axis depicts time.

As may happen, when a battery discharge rate is not adaptive, the SOC of the battery 104 may deplete more quickly over a highway segment, such as S3. Thus, FIG. 4A illustrates that the battery discharge rate may be −0.1%/s. At this rate, the battery power may deplete more rapidly and inefficiently than if the discharge rate was lower, such as in the city segment, S5. During the off-ramp segment, S4, regenerative braking may increase the SOC of the vehicle 100. As rapidly increasing the SOC of the battery 104 may cause an issue, such as overheating, the CPU module 106 may only allow the battery 104 to increase at a certain rate for all regeneration, as the CPU module 106 may not know the length of the regeneration period. Thus, the battery 104 may increase in SOC at a rate of +0.01%/s. However, if the CPU module 106 knew that the regenerative period of the route was a short distance, then the CPU module 106 may allow the battery 104 to charge at a faster rate, as the battery 104 will not generate as much heat over a shorter amount of time.

As is shown during segment S5, the battery 104 may discharge at a lower rate through a city segment of a route than it would over a highway segment, possibly resulting in better efficiency. However, since the SOC depletion rate of the highway segment S3 was so high, the SOC reaches the discharge threshold before the end of the city segment S5 and the engine 102 must provide the remaining energy which may reduce the overall efficiency.

Figure 4B:
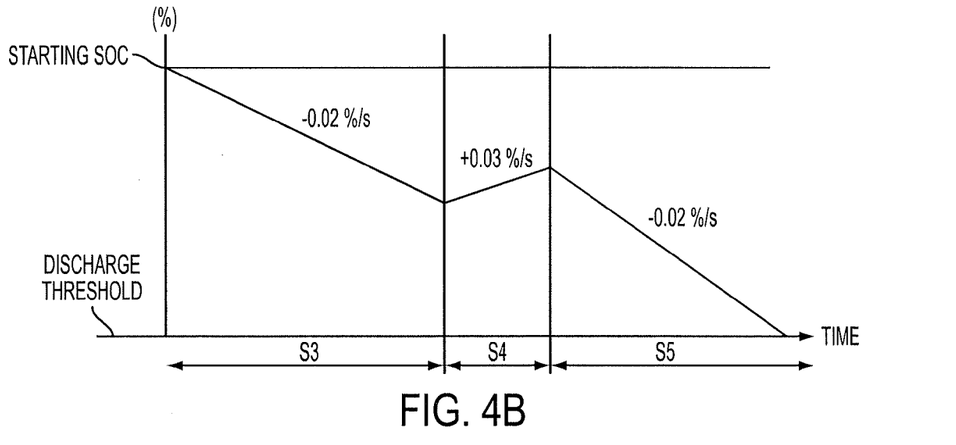
FIG. 4B illustrates discharge rates of a vehicle which may be utilizing adaptive battery charge and discharge rates and limits according to an embodiment of the present invention.

FIG. 4B illustrates discharge rates of a vehicle which may be utilizing adaptive battery charge and discharge rates and limits. In FIG. 4B, a graphical depiction of SOC depletion over segments S3 (highway segment), S4 (off-ramp), and S5 (city) is illustrated. The y-axis depicts SOC, and the x-axis depicts time.

In FIG. 4B, the route may already be known, including peak and/or average battery discharge rates and charge requests for each of the segments. If so, the CPU module 106 may have calculated an optimal battery discharge rate for the entire route. This optimal battery discharge rate may be such a rate as to, for example, be the most energy efficient, allow the vehicle 100 to operate in a mode such as EV mode until, but not after, the end of the route, etc. The optimal battery discharge rate (along with any optimal battery charge rates) may be calculated in any manner by the CPU module 106. For example, the CPU module 106 may expect a certain amount of SOC charge, for example, during downhill segments, off-ramps, or any other type of environment when the vehicle may generate battery charge. Because the route is known, the CPU module 106 may have enough information to calculate maximum battery charge limit (+%/s) for the energy-generating segment(s) of the route. For example, the maximum charge limit may be such that the battery 104 can gain as much charge as possible and still satisfy the battery protection requirements. Utilizing the information stored in the memory 108, such as length, slope, etc. and the maximum charge limit of the power generating segments, the CPU module 106 may calculate an estimated SOC gain for the route.

For example, the CPU module 106 may calculate total energy depletion for the segments in which the battery discharges power. Utilizing this estimated total energy depletion, the battery discharge and charge rates for each segment (possibly utilizing a discharge rate close to the average discharge rate over city segments), the current SOC of the battery 104, and the estimated SOC gain of the route, the CPU module 106 may calculate an optimal battery discharge rate for the entire route. For example, this discharge rate may be such that the SOC may reach the discharge threshold at the time in which the route ends. However, the CPU module 106 may have other methods for calculating an optimal battery discharge rate.

In the embodiment depicted in FIG. 4B, the CPU module 106 may have calculated an optimal discharge rate of −0.02%/s. Thus, during all SOC depletion segments, the CPU module 106 may, utilizing input from the BMS 114, instruct the transmission 112 to discharge the battery 104 such that the discharge rate remains at −0.02%/s during each of the segments (S1, S3 and S5) in which the battery 104 is discharging and not a high power demand segment (such as the freeway on-ramp segment, S2). As illustrated, the discharge rate during segment S3 has decreased from −0.1%/s to −0.02%/s. At the lower discharge rate, the amount of energy spent may be more efficiently utilized. Also illustrated, the maximum charge limit of the battery 104 has increased during segment S4, the off-ramp segment, to +0.03%/s from +0.01%/s. The CPU module 106 may have determined that, for the length of the off-ramp, the amount of available energy, the current state of the battery, etc., the battery 104 may charge at a rate of +0.03%/s and not depart from the battery hardware protection limits. However, +0.03%/s may be the maximum charge rate which can be utilized for this segment, such that the maximum amount of energy is gained without damage to the battery 104.

In other embodiments, the CPU module 106 may use the information associated with the known route in the memory 108 and/or current battery charge information from the BMS 114 in calculations to determine optimal charge/discharge rates and limits for the vehicle 100 in order to maximize performance. For example, the CPU module 106 may calculate charge/discharge rates such that when high power demand requests are received, the battery 104 discharges at a maximum discharge limit that can be allowed for the expected duration of each high power demand.

In other embodiments, the CPU module 106 may, for example, utilize more than one method of optimal battery discharge rate and/or limit calculation. For example, let's use the segments of FIG. 2 as an example. The CPU module 106 may determine the maximum discharge limit for the on-ramp segment, S2, such that the highest battery power limit that can be allowed for the duration of the segment may be applied, and/or may calculate the maximum charge limit for the off-ramp segment, S4, such that the most charge may be stored while satisfying protection limits for the battery 104, as individual segments. Additionally, the CPU module 106 may calculate an optimal discharge rate for the combination of the remaining segments, city segments S1 and S5, and highway segment S3, such that the difference in the power discharge from segment S2 and the power charge from S4, and the discharge threshold, may be divided between the remaining segments equally, or so that the segments have a uniform battery discharge rate between them. In other embodiments, the CPU module 106 may use a calculation to determine an optimal charge and/or discharge rate for each of the segments individually, or any groups of segments, or any combination of individual segments and groups of segments. All of these calculations of the CPU module 106 may be performed using known route information stored in the memory 108, battery charge information stored in the memory 108, current battery charge information from the BMS 114, and/or current location information.

In other embodiments, the CPU module 106 may determine, based on segment information stored in the memory 108, that it may be ideal to discharge more or less power at a particular segment. For example, if the CPU module 106 knows that, on the known route, a large battery power generation segment, such as a long downhill, is approaching, it may determine to instruct the transmission 112 to discharge more battery power during the segments before and/or after the power generation segment. For example, a CPU module 106 may determine, based on current charge and discharge information received from the BMS 114, as well as route information stored in the memory 108, that there will be an excess in battery charge, and/or that utilizing the optimal charge rate for the segment would result in enough power within the battery 104 to reach the charge threshold. In a situation like the above-mentioned, the CPU module 106 may instruct the transmission to request more discharge from the battery 104 before and/or after the battery power generation segment. In some embodiments, the CPU module 106 may recalculate all optimal battery discharge and charge rates and maximum discharge limits based on changes to the information in the memory 108 associated with the known rate and any information obtained from the BMS 114 about the battery charge status and rate during each segment or continuously throughout the route.

Figure 5:
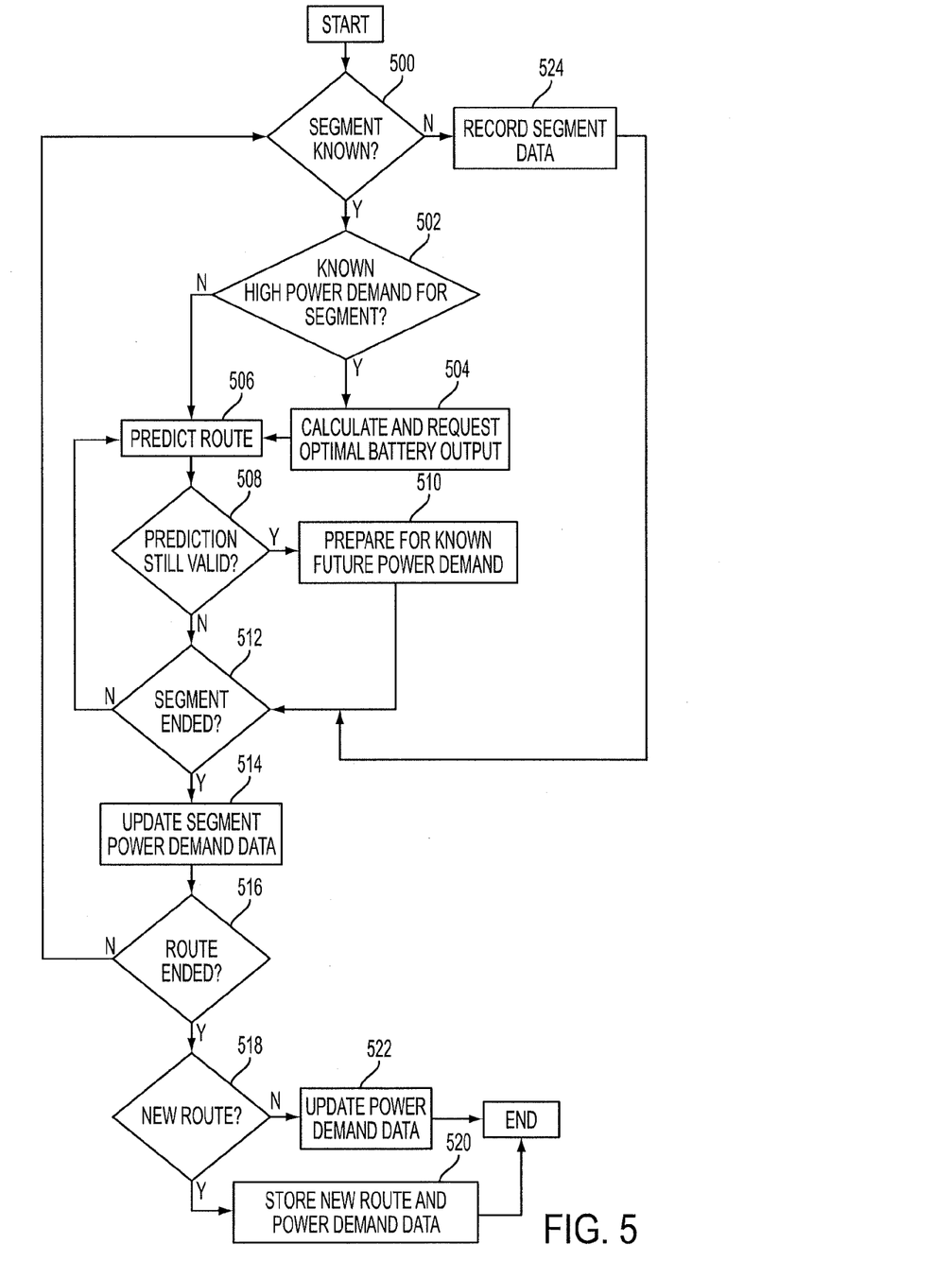
FIG. 5 illustrates an exemplary process for adaptive battery charge and/or discharge rates and limits according to an embodiment of the present invention.

FIG. 5 illustrates an exemplary process for adaptive battery charge and/or discharge rates and limits. In block 500, the CPU module 106 determines whether or not the current segment is known. This may be determined, for example, by comparing current information, such as location, heading, etc., for example, from the GPS 110, with the information contained in memory 108 to determine if a segment is stored which matches the current information. If it is determined that a segment is known, the process may proceed to block 502. In block 502, the CPU module 106 may determine, based on information within the battery 104, whether there is a known high power demand for the segment. This may be determined by looking up, in the memory 108, the record associated with the segment and determining whether a high power demand is associated with the segment.

If there is a high known power demand for the segment, in block 504, the CPU module 106 may calculate a maximum discharge limit for the segment, as discussed above. After calculating a maximum discharge limit, the CPU module 106 may instruct the transmission 112 to apply the maximum rate of discharge to the battery 104 and/or engine 102.

In block 506, the CPU module 106 may predict the route as discussed above in this document. After the route has been predicted, the CPU module 106 may determine, in block 508, whether or not the predicted route is still valid. For example, if a next segment correlates to the predicted route, or if the present heading, a change of direction, etc. correlate to the predicted route information within the memory 108, then the CPU module 106 may determine that the predicted route is still valid.

If the route prediction is still valid, in block 510, the CPU module 106 may look up the route in the memory 108 to determine any upcoming power demands. Utilizing the knowledge of any upcoming power demand segments, the CPU module 106 may prepare for any power demand(s). For example, the CPU module 106 may adjust a current charge/discharge rate of the battery 104 through the transmission 112, the CPU module 106 may calculate a maximum discharge limit for the upcoming power demand segment, the CPU module 106 may change calculations for charge/discharge rates for upcoming segments, etc.

In block 512, the CPU module 106 may determine, based on current information, e.g., information received from the GPS 110, and/or information stored in the memory 108, whether the current segment has ended. For example, the CPU module 106 may know that the segment has ended if current location data correlates to data within the memory 108 associated with an end location for the segment, if an identifier used to parse a route into segments has been encountered, etc. If the segment has not ended, the process may return to block 506.

After the segment, in block 514, the CPU module 106 may update segment battery charge information within the memory 108. The CPU module 106 may store in the memory 108 any charge information, such as discharge rates, present charge state such as SOC, etc. In block 516, the CPU module 106 may determine if the route has ended. This may be determined, for example, by a stop of the vehicle 100, an ignition off event, if the segment is recorded as the last segment of the route in the memory 108, etc.

If it is determined that the route has ended, in block 518 the CPU module 106 may determine if the route is a new route. For example, if the route contains segments which were not known, if the order of segments does not match with any recorded route, etc., the route may be a new route. If the route is a new route, in block 520, the CPU module 106 may store in the memory 108 information associated with the new route. This information may include, for example, a route identifier, segment identifier(s), etc. The CPU module 106 may also store in the memory 108 any battery charge information which the CPU module 106 is aware of for any segment within the route, such as SOC for each segment, any power demands, any battery charge/discharge rate, any maximum charge/discharge limits, etc.

If the route is not a new route, in block 522, the CPU module 106 may store in the memory 108 any battery charge information which the CPU module 106 is aware of for any segment within the route, such as SOC for each segment, any power demands, any battery charge/discharge rate, etc.

In block 500, if a segment is not known, the CPU module 106 may store, in the memory 108, any segment information. For example, the CPU module 106 may create an entry within the memory 108 containing segment information, such as "from" segment, "to" segment, location information, etc.

Figure 6:
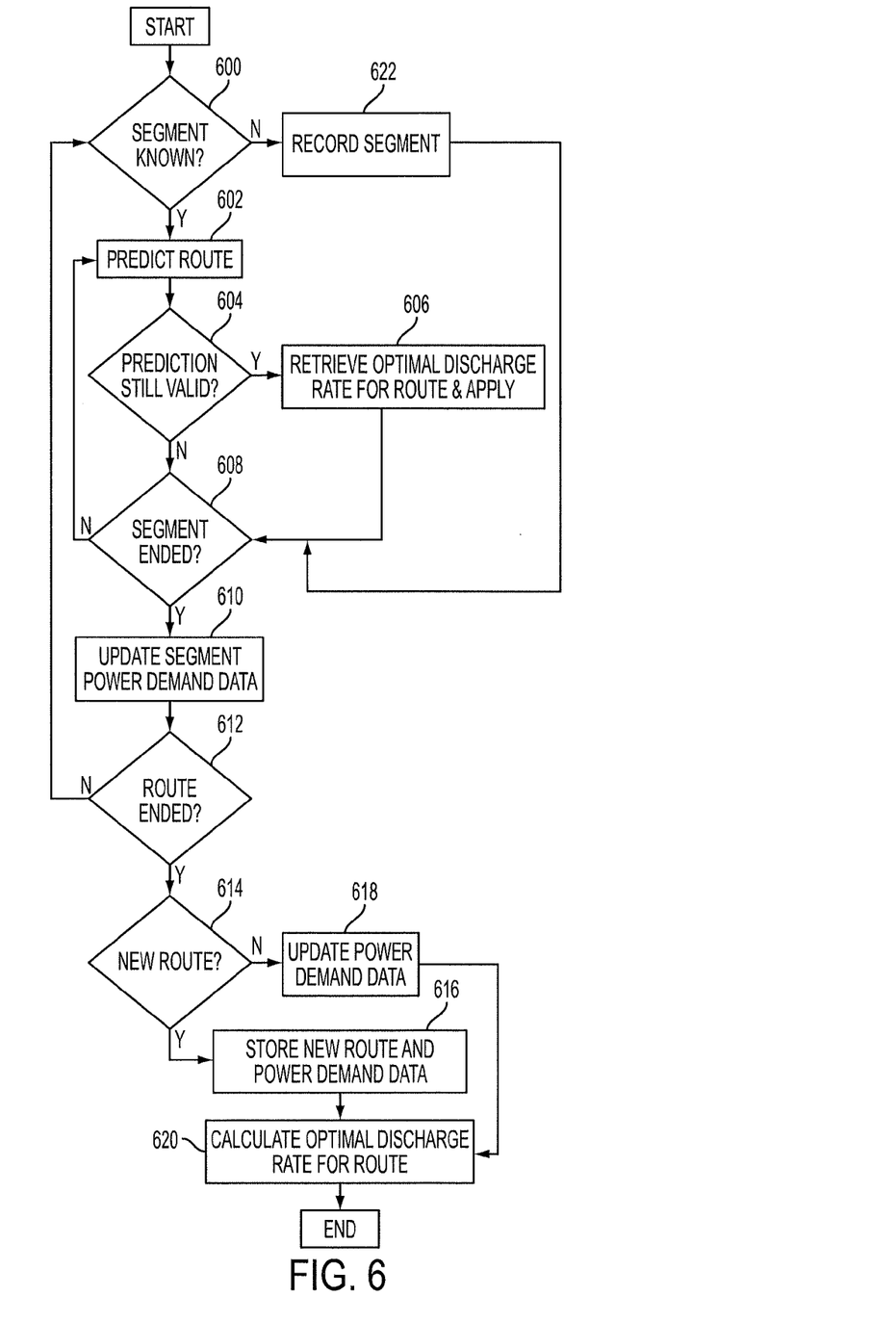
FIG. 6 illustrates an exemplary process for adaptive battery charge and/or discharge rates and limits according to an embodiment of the present invention.

FIG. 6 illustrates an exemplary process for adaptive battery charge and/or discharge rates and limits. In block 600, the CPU module 106 may determine if the segment is known. This determination may be determined in the same manner as in block 500 above. In block 602, the CPU module 106 may, based on current vehicle 100 information, for example obtained by the GPS 110, and based on information within the memory 108, such as route entries and segment entries, predict a route. In block 604, as in block 508 above, the CPU module 106 may determine whether the prediction is still valid, based on, for example, a next segment, a current location, information within the memory 108, etc.

If the route prediction is still valid, in block 606, the CPU module 106 may retrieve, from the memory 108, an optimal battery charge/discharge rate for the route, for a segment, and/or for a selection of segments. After retrieving the optimal battery discharge rate, the CPU module 106 may request that the transmission 112 apply the optimal battery discharge rate associated with the segment to the segment. For example, a discharge rate may be the same for an entire route, for only one segment, and/or from a collection of segments. Whichever discharge rate applies to the segment is applied to the battery 104 and/or the engine 102 by, for example, the transmission 112. Furthermore, maximum charge/discharge limits may be stored for certain segments of the route which the CPU module 106 may apply.

In block 608, the CPU module 106 may determine whether or not the segment has ended, such as in block 512 above. If the segment has ended, in block 610, the CPU module 106 may record battery charge information in the memory 108. This information may include, for example, a charge/discharge rate, a maximum charge/discharge limit, a current charge, a current power distribution, etc., as in block 514 above. In block 612, as in block 516 above, the CPU module 106 may determine whether the route has ended or not. For example, the CPU module 106 may determine this based on route information within the memory 108, a vehicle 100 stop, an off operation by the vehicle 100, etc.

In block 614, the CPU module 106 may determine if the route which has ended is a new route. As in block 518 above, the CPU module 106 may determine this based on route information stored within the memory 108, segment information within the memory 108, current location data, etc.

If the route is a new route, in block 616, the CPU module 106 may store in the memory 108 information associated with the new route, such as segments within the route, route identifiers, etc. In block 616 the CPU module 106 may also record, within the memory 108, any battery charge information associated with any segment of the new route, and associate this information with the segment and/or route. In block 618, the CPU module 106 may record, in the memory 108, any updated battery charge information, such as discharge rates, limits, current battery charge, etc. For example, the CPU module 106 may store all of this information associated with the route. The CPU module 106 may also only store this information which differs from information previously stored within the memory 108 or the CPU module 106 may not update any information at all.

In block 620, the CPU module 106 may calculate, for the route, for segments within the route, and/or for combinations of segments within the route, an optimal battery charge/discharge rate. This optimal battery charge/discharge rate may be stored in the memory 108 and may be associated with the route information in the memory 108.

In block 622, the CPU module 106 may record, for example, in the memory 108, segment information, such as a segment identifier, "from" segments, "to" segments, etc.

Those of ordinary skill would appreciate that any time charge and discharge is mentioned herein, that the other of charge and discharge may be applied. Those of ordinary skill would additionally appreciate that any time a discharge or charge rate is mentioned as being applied to a battery, a transmission, or any other device, may also adjust a power request from an engine. It will be apparent that in any flow chart, process, etc, the steps may be performed in an order other than that described, as the descriptions only refer to embodiments.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for adaptively adjusting a discharge rate of a battery based on a driving route of a vehicle, the method comprising:

storing, in a memory, a driving route having a plurality of segments and a plurality of discharge rates of the battery each corresponding to at least one of the plurality of segments and having been detected during a previous trip of the vehicle along the at least one of the plurality of segments;

detecting, by a GPS unit, a current location of the vehicle;

calculating, using a processor, an optimal discharge rate of the battery for the driving route that is different than a standard discharge rate of the battery and is based on the stored plurality of segments, the stored plurality of discharge rates and the current location of the vehicle; and requesting, by the processor, the battery to discharge at the optimal discharge rate for at least one segment of the route.

2. The method of claim 1 wherein the optimal discharge rate is calculated to have a value similar to the discharge rate of the battery along a city segment of the driving route.

3. The method of claim 1 wherein the processor is further configured to calculate the optimal discharge rate to be a rate at which battery power may be provided constantly during the driving route.

4. The method of claim 1 further comprising:
selecting, using the processor, at least one candidate route;
assigning, using the processor, a route weight for each of the candidate routes; and
predicting, using the processor, a predicted route by selecting the candidate route with the highest route weight, wherein the predicted route is the driving route.

5. The method of claim 1 wherein the vehicle can operate in an electronic vehicle (EV) mode for the duration of the driving route when the battery is discharging at the optimal discharge route.

6. The method of claim 1 further comprising calculating, by the processor, a new optimal discharge rate during each of the plurality of segments based on a current state of charge and information stored in the memory that is associated with each of the plurality of segments that the vehicle has not yet traversed during the current trip along the route.

7. The method of claim 1 wherein the usable energy of the battery is nearly depleted upon completion of the driving route.

8. A method for adaptively adjusting a maximum discharge rate limit of a battery based on a driving route, the method comprising:

storing, in a memory:
a segment of a driving route associated with a high power request,
a duration of a power request of a battery during a previous trip of the vehicle along the segment, and
an amount of power requested from the battery during a previous trip of the vehicle along the segment;

detecting, by a GPS unit, a current location of the vehicle;

calculating, using a processor, a maximum discharge rate limit of the battery for the segment that is different than a standard discharge rate of the battery and is based on the stored segment, the stored duration of the power request, the stored amount of power requested from the battery and the current location of the vehicle; and requesting, by the processor, the battery to discharge at a rate that is less than or equal to the maximum discharge rate limit while the vehicle is traveling along the segment.

9. The method of claim 8 wherein the maximum discharge rate limit for the segment is calculated such that the battery can discharge at or below the maximum discharge rate limit while the vehicle is traveling along the entire segment.

10. The method of claim 9 wherein the processor is further configured to calculate the maximum discharge rate limit to be a rate at which the battery will include sufficient charge to constantly discharge during a trip of the vehicle along the driving route.

11. The method of claim 10 wherein the maximum discharge rate limit is calculated based on battery values corresponding to battery protection limits.

12. The method of claim 8 wherein the maximum discharge rate limit is calculated such that the vehicle can complete the segment without engaging an engine of the vehicle.

13. The method of claim 8 wherein the maximum discharge rate limit is calculated based on a current state of charge of the battery.

14. The method of claim 8, further comprising storing, by the memory:
a second segment of the driving route that is associated with another high power request;
a duration of a power request of the battery during a previous trip of the vehicle along the second segment; and
an amount of power requested from the battery during a previous trip of the vehicle along the second segment,
wherein the maximum discharge rate limit is further calculated based on the second stored segment, the stored duration of the power request corresponding to the second segment and the stored amount of power requested from the battery corresponding to the second segment.

15. The method of claim 8 further comprising:
selecting, using the processor, at least one candidate route;
assigning, using the processor, a route weight for each of the candidate routes;
predicting, using the processor, a predicted route by selecting the candidate route with the highest route weight, wherein the predicted route is the driving route.

16. A method for adaptively adjusting a maximum charge rate limit of a battery based on a driving route, the method comprising:

storing, in a memory:
a segment of a driving route associated with a high charging request,
a duration of a charging request of a battery during a previous trip of the vehicle along the segment, and
an amount of charging requested from the battery during a previous trip of the vehicle along the segment;

detecting, by a GPS, a current location of the vehicle;

calculating, using a processor, a maximum charge rate limit of the battery for the segment that is different than a standard charge rate of the battery and is based on the stored segment, the stored duration of the charging request, the stored amount of charging requested from the battery and the current location of the vehicle; and requesting, by the processor, the battery to discharge at a rate that is less than or equal to the maximum discharge rate limit while the vehicle is traveling along the segment.

17. The method of claim 16 wherein the maximum charge rate limit for the segment is calculated such that the battery can charge at or below the maximum charge rate limit while the vehicle is traveling along the entire segment.

18. The method of claim 17 wherein the processor is further configured to calculate the maximum charge rate limit to be a rate at which the battery can constantly charge during a trip of the vehicle along the driving route.

19. The method of claim 16 wherein the processor is further configured to calculate the maximum charge rate limit based on values for a current state of charge of the battery and a charge threshold of the battery.

20. The method of claim 16 further comprising:
- selecting, using a processor, at least one candidate route;
- assigning, using the processor, a route weight for each of the candidate routes; and
- predicting, using the processor, a predicted route by selecting the candidate route with the highest route weight, wherein the predicted route is the driving route.

21. A method for adaptively adjusting a discharge rate of a battery based on a known driving route of a vehicle, the method comprising:
- selecting, using a processor, at least one candidate route;
- assigning, using the processor, a route weight for each of the candidate routes;
- predicting, using the processor, a predicted route by selecting the candidate route with the highest route weight;
- storing, in a memory, a driving route having a plurality of segments and a plurality of discharge rates of the battery that each corresponding to at least one of the plurality of segments and having been detected during a previous trip of the vehicle along the at least one of the plurality of segments;
- calculating, using a processor, an optimal discharge rate for the predicted driving route based on the stored driving route and the plurality of discharge rates of the battery; and
- requesting, by the processor, the battery to discharge at the optimal discharge rate for at least one segment of the route.

* * * * *